United States Patent
Moose et al.

(10) Patent No.: US 6,459,745 B1
(45) Date of Patent: Oct. 1, 2002

(54) FREQUENCY/TIMING RECOVERY CIRCUIT FOR ORTHOGONAL FREQUENCY DIVISION MULTIPLEXED SIGNALS

(75) Inventors: Paul H. Moose, Carmel, CA (US); Michael J. Geile, Batavia, OH (US); Richard C. North, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/404,003

(22) Filed: Sep. 23, 1999

(51) Int. Cl.[7] .................................................. H04L 7/00
(52) U.S. Cl. .................. 375/355; 375/375; 375/357; 375/316; 375/262

(58) Field of Search ................................. 375/316, 354, 375/355, 375, 371, 262, 357, 261

(56) References Cited

U.S. PATENT DOCUMENTS 5,694,389 A * 12/1997 Seki et al. ................... 370/208
6,137,847 A * 10/2000 Stott et al. ................... 370/480

* cited by examiner

Primary Examiner—Chi Pham
Assistant Examiner—Pankaj Kumar
(74) Attorney, Agent, or Firm—Peter A. Lipovsky; James A. Ward; Celia C. Dunham

(57) ABSTRACT

An OFDM frequency/timing recovery circuit provides accurate recovery of both sub-carrier frequency and symbol timing information from a single OFDM symbol. Accuracy may be further enhanced in demanding applications by utilizing two OFDM symbols. A unique frequency/timing recovery symbol is used that is an OFDM symbol.

7 Claims, 7 Drawing Sheets

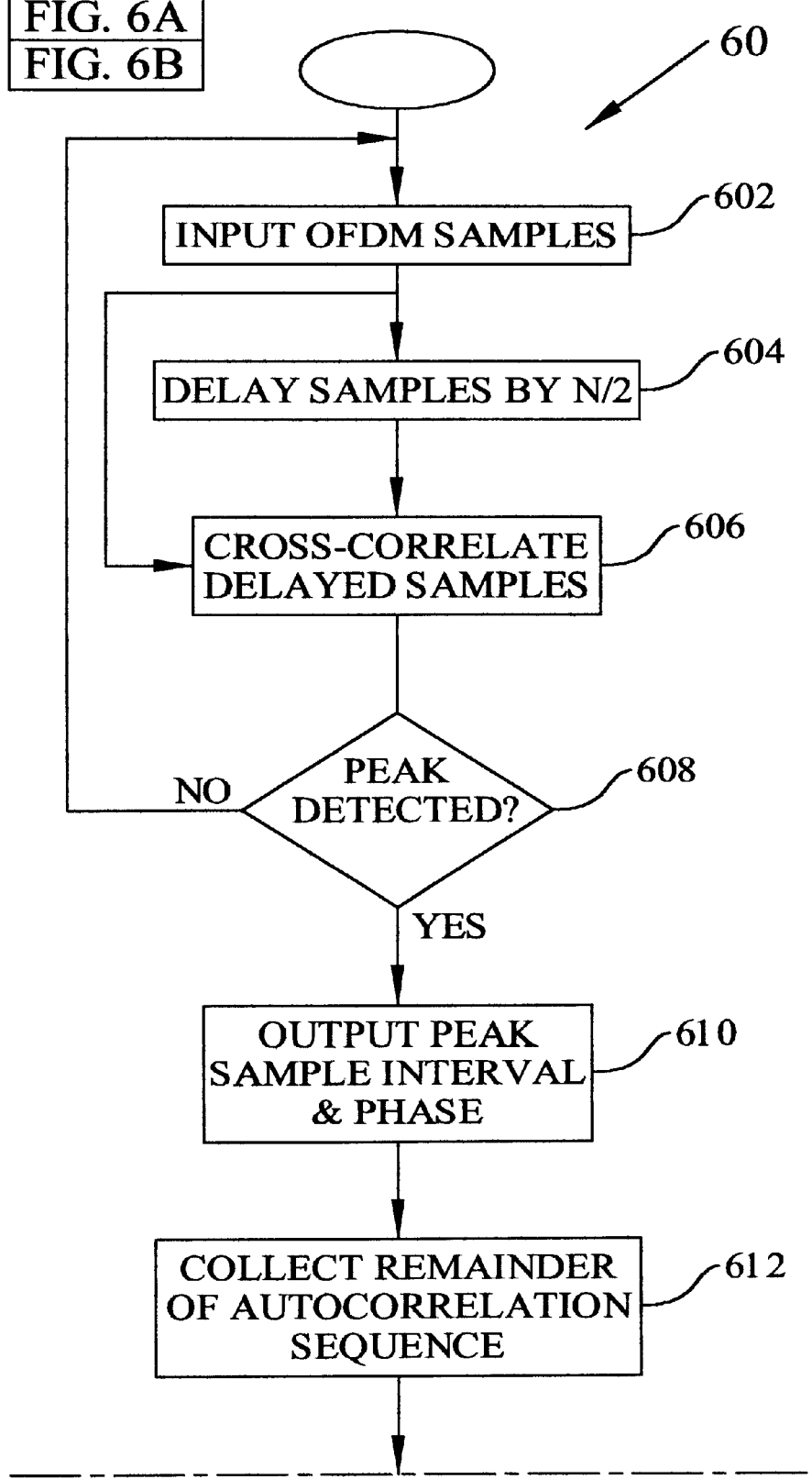

FREQUENCY/TIMING RECOVERY CIRCUIT FOR ORTHOGONAL FREQUENCY DIVISION MULTIPLEXED SIGNALS

The invention described below is assigned to the United States Government and is available for licensing commercially. Technical and licensing inquiries may be directed to Harvey Fendelman, Patent Counsel, Space and Naval Warfare Systems Center San Diego, Code D0012 Rm 103, 53510 Silvergate Avenue, San Diego, Calif. 92152; telephone no. (619)553-3001; fax no. (619) 553-3821.

BACKGROUND OF THE INVENTION

The present invention relates generally to recovery of symbol timing and sub-carrier frequency information from orthogonal frequency division multiplexed (OFDM) digital communications signals. More specifically, but without limitation thereto, the present invention relates to a circuit for synchronizing OFDM signals subjected to multi-path fading and additive noise.

OFDM signals comprise several concurrently transmitted and independently modulated sub-carrier signals. The sub-carriers are spaced in frequency at the reciprocal of the OFDM symbol period such that the sub-carriers are all mutually orthogonal in the ordinary mathematical sense. OFDM signals typically contain several hundred or more sub-carriers, and the bandwidth occupied by an OFDM signal equals the number of sub-carriers times the symbol rate. Because each sub-carrier is independently modulated, the temporal and spatial characteristics of OFDM symbols are similar to those of broadband noise.

Synchronization of the sub-carrier frequencies and the symbol timing is desirable to extract and decode information from the OFDM signal, particularly in wireless communications systems where multi-path channel effects introduce more distortion and frequency offset than wire line or cable communications systems. A need therefore exists for an OFDM frequency/timing recovery circuit that can generate accurate symbol timing and sub-carrier frequency information even in the presence of severe frequency selective multi-path fading and additive noise.

SUMMARY OF THE INVENTION

The present invention is directed to overcoming the problems described above, and may provide further related advantages. No embodiment of the present invention described herein shall preclude other embodiments or advantages that may exist or become obvious to those skilled in the art.

An OFDM frequency/timing recovery circuit of the present invention provides accurate recovery of both sub-carrier frequency and symbol timing information from a single OFDM symbol. Accuracy may be further enhanced in demanding applications by utilizing two OFDM symbols. A unique frequency/timing recovery symbol is used that is an OFDM symbol in which each sub-carrier is differentially phase modulated with respect to each adjacent sub-carrier with random information. The phase modulation values contained in the frequency/timing recovery symbol are fixed and known by the receiver. Also, they are selected in such a way that they contain two or more identical fractional parts, for example, identical first and second halves of the frequency/timing recovery symbol. A correlator is used to compare redundant portions the input RF/IF signal symbols until a correlation peak magnitude is found. The sample time at the correlation peak provides an estimate of symbol timing. The phase of the correlation peak provides an estimate of carrier frequency offset modulo the sub-carrier spacing. Using these initial estimates, the frequency/timing recovery symbol is processed a second time to refine the estimates. The differential phase modulation is recovered from the frequency/timing recovery symbol and correlated with the known phase modulation values. The location of the peak of the correlation function yields the integer number of sub-carrier frequency offsets and the phase yields a refined estimate of the symbol timing.

An advantage of the frequency/timing recovery circuit of the present invention is the amount of time, measured in numbers of transmission symbols, required to achieve synchronization.

Another advantage is that most of the symbols in a information packet may be dedicated to information rather than synchronization.

The features and advantages summarized above in addition to other aspects of the present invention will become more apparent from the description, presented in conjunction with the following drawings.

DESCRIPTION OF THE INVENTION

The following description is presented solely for the purpose of disclosing how the present invention may be made and used. The scope of the invention is defined by the claims.

Figure 1:
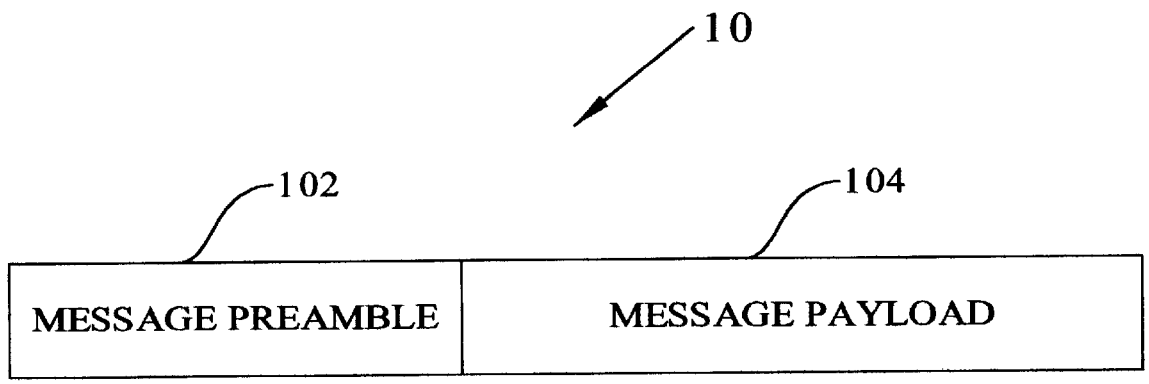
FIG. 1 is a diagram of an orthogonal frequency division multiplexed (OFDM) message packet.

FIG. 1 is a diagram of an orthogonal frequency division multiplexed (OFDM) message packet 10 comprising a preamble 102 and a message payload 104. Message preamble 102 contains the information used for extracting OFDM symbols encoded in message payload 104. Each OFDM symbol has a number of sub-carriers spaced in frequency by an amount equal to the reciprocal of the symbol interval ΔT. Each sub-carrier is phase and/or amplitude modulated independently so that a message packet contains a total number of bits of information equal to the product of the number of sub-carrier frequencies times the modulation information bits times the number of symbols in the message packet.

Figure 2:
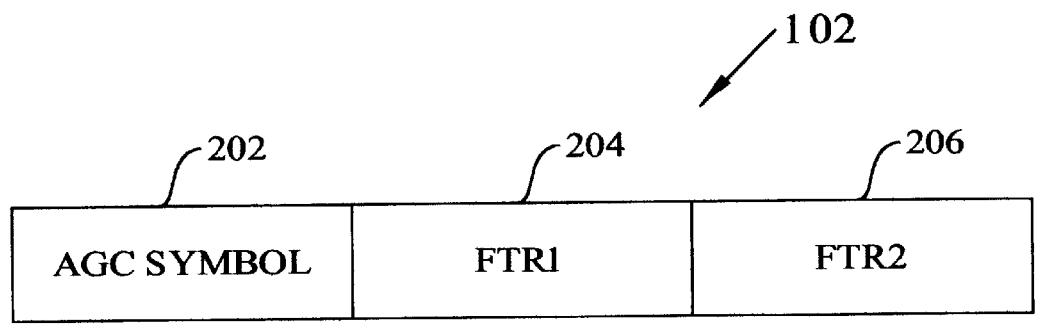
FIG. 2 is an expanded diagram of the message preamble in FIG. 1.

FIG. 2 is an expanded diagram of message preamble 102 in FIG. 1 comprising AGC symbol 202, a frequency/timing recovery symbol (FTR1) 204, and an optional second frequency/timing recovery symbol (FTR2) 206. AGC symbol 202 indicates whether gain is required to bring the signal levels within the receiver's dynamic range.

Figure 3:
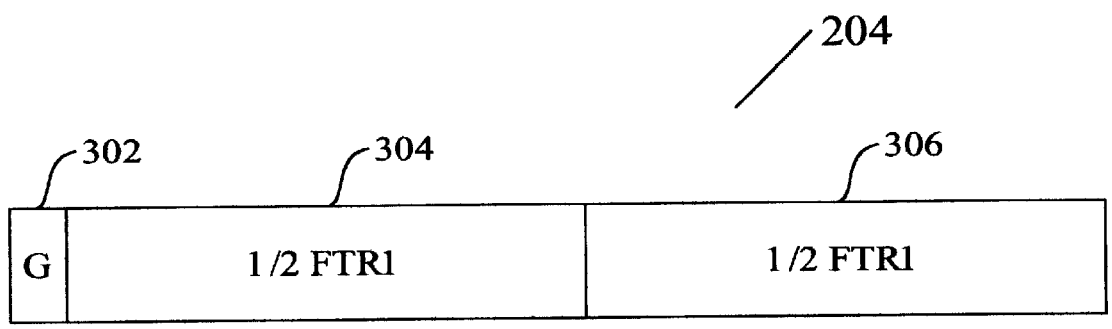
FIG. 3 is an expanded diagram of the frequency/timing recovery symbol in FIG. 2.

FIG. 3 is an expanded diagram of an exemplary frequency/timing recovery symbol FTR1 204 in FIG. 2. Frequency/timing recovery symbol FTR1 204 comprises a guard band 302 and identical frequency/timing recovery symbol halves 304 and 306. At least two identical fractional parts are required for FTR1. In this example halves are used, but a greater number of identical fractional parts may also be used to practice the present invention. In typical OFDM symbols, guard band 302 contains a cyclic extension of message payload data to prevent inter-symbol interference in unequalized channels such as wireless channels having multi-path. In the present invention, guard band 302 contains random data that is not related to the data in recovery symbol halves 304 and 306.

Figure 4:
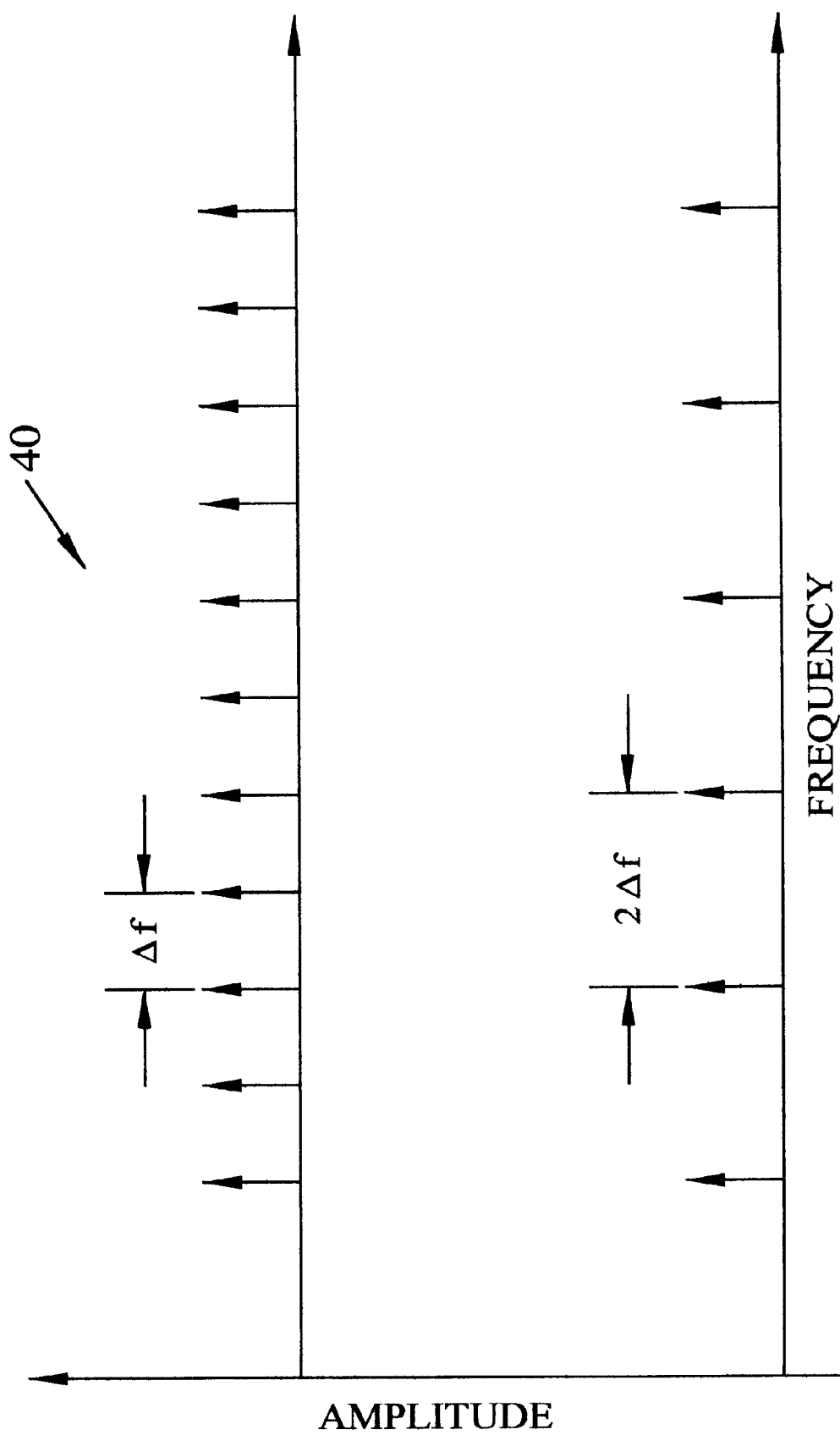
FIG. 4 is a diagram of OFDM symbol sub-carrier frequency spacings for an ordinary OFDM data symbol in the message packets and the sub-carrier frequency spacings for the frequency/timing recovery symbol of the present invention.

FIG. 4 is a diagram illustrating OFDM sub-carrier frequency spacings $\Delta f$ for an ordinary OFDM message symbol and offsets at 2 $\Delta f$ for frequency/timing recovery symbol FTR1 204 shown in FIG. 3. Since second half 306 of FTR1 204 is a replica of first half 304 with a period of ½ $\Delta T$, the sub-carrier frequencies are spaced by twice the sub-carrier frequency let; spacing of ordinary OFDM message symbols. FTRL 204 may be described mathematically by its complex modulation envelope as follows:

$$x(u) = \sum_k x_k(u), \ 0 \leq u \leq \Delta T \tag{1}$$

where $\Delta T = 1/\Delta f$, $\Delta f$ is the sub-carrier frequency spacing, and $$x_k(u) = A \exp[j(2\Pi k(2\Delta f)u + \Phi_k)], \ -K/4 \leq k \leq K/4 - 1 \tag{2}$$

where K is the number of sub-carrier frequencies in an ordinary OFDM message symbol, and $$\Phi_k = \Phi_{k-1} + \Theta_k \tag{3}$$

where $\Phi$ and $\Theta$ are the differentially encoded phase modulation values and the randomly selected data phase modulation values respectively.

The number of phase values encoded into each sub-carrier may be the same in FTR1 204 as in the OFDM information symbols, but not necessarily. For example, in one embodiment of the present invention $\Theta_k$ may be selected randomly and encoded into FTR1 204 as QPSK phase values from the following set:

$$\Theta_k \in \{\pm \Pi/4, \pm 3\Pi/4\} \tag{4}$$

By sampling the signal described in equation (1) at sampling intervals $\Delta t = \Delta T/N$, where N is the number of time samples in FTR1 204, the discrete time signal corresponding to FTR1 204 may be expressed as:

$$x(n) = \sum_k x_k(n), \ 0 \leq n \leq N - 1 \tag{5}$$

where $$x_k(n) = A \exp[j(2\Pi k(2n)/N + \Theta_k)], \ -K/4 \leq k \leq K/4 - 1 \tag{6}$$

where A is an amplitude coefficient. From equations (5) and (6) it follows that:

$$x(n) = x(n + N/2), \ 0 \leq n \leq N/2 - 1 \tag{7}$$

so that the first and second halves of FTR1 204 are identical.

Figure 5:
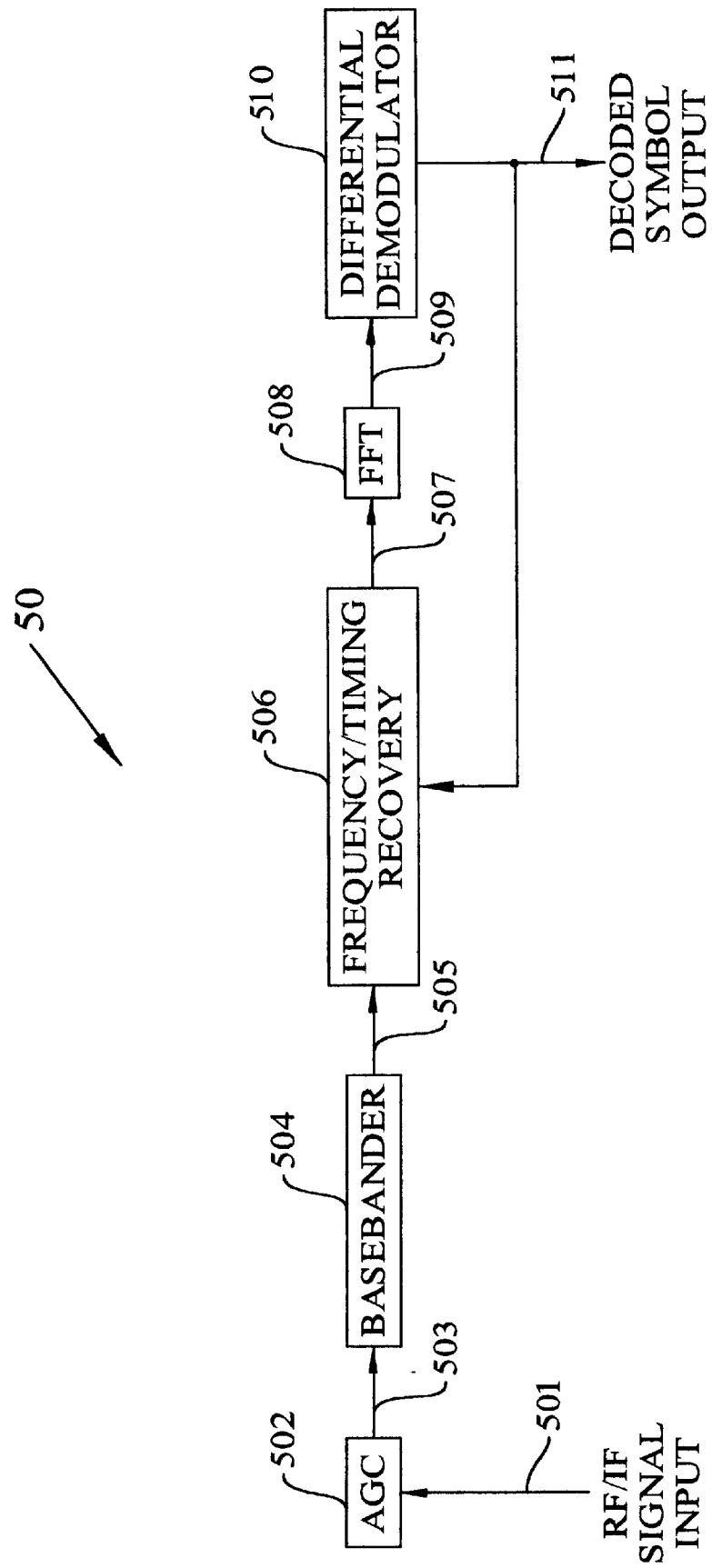
FIG. 5 is a diagram of an exemplary OFDM communications receiver implementing an OFDM frequency/timing recovery circuit of the present invention.

FIG. 5 is a diagram of an exemplary OFDM communications receiver 50 embodying an OFDM frequency/timing recovery circuit 506 of the present invention. An RF or IF signal 501 is input to AGC 502. AGC 502 amplifies RF/IF signal 501 to a convenient amplitude range and outputs amplified signal 503 to basebander 504. Basebander 504 translates RF/IF amplified signal 503 to baseband and outputs in-phase and quadrature-phase samples 505 to frequency/timing recovery circuit 506. Output 507 of frequency/timing recovery circuit 506 is input to FFT 508. Complex frequency coefficients 509 output from FFT 508 are input into differential demodulator 510 to recover the data phase modulation values ok. Output 511 of differential demodulator 510 is fed back to frequency/timing recovery circuit 506.

Figure 6B:
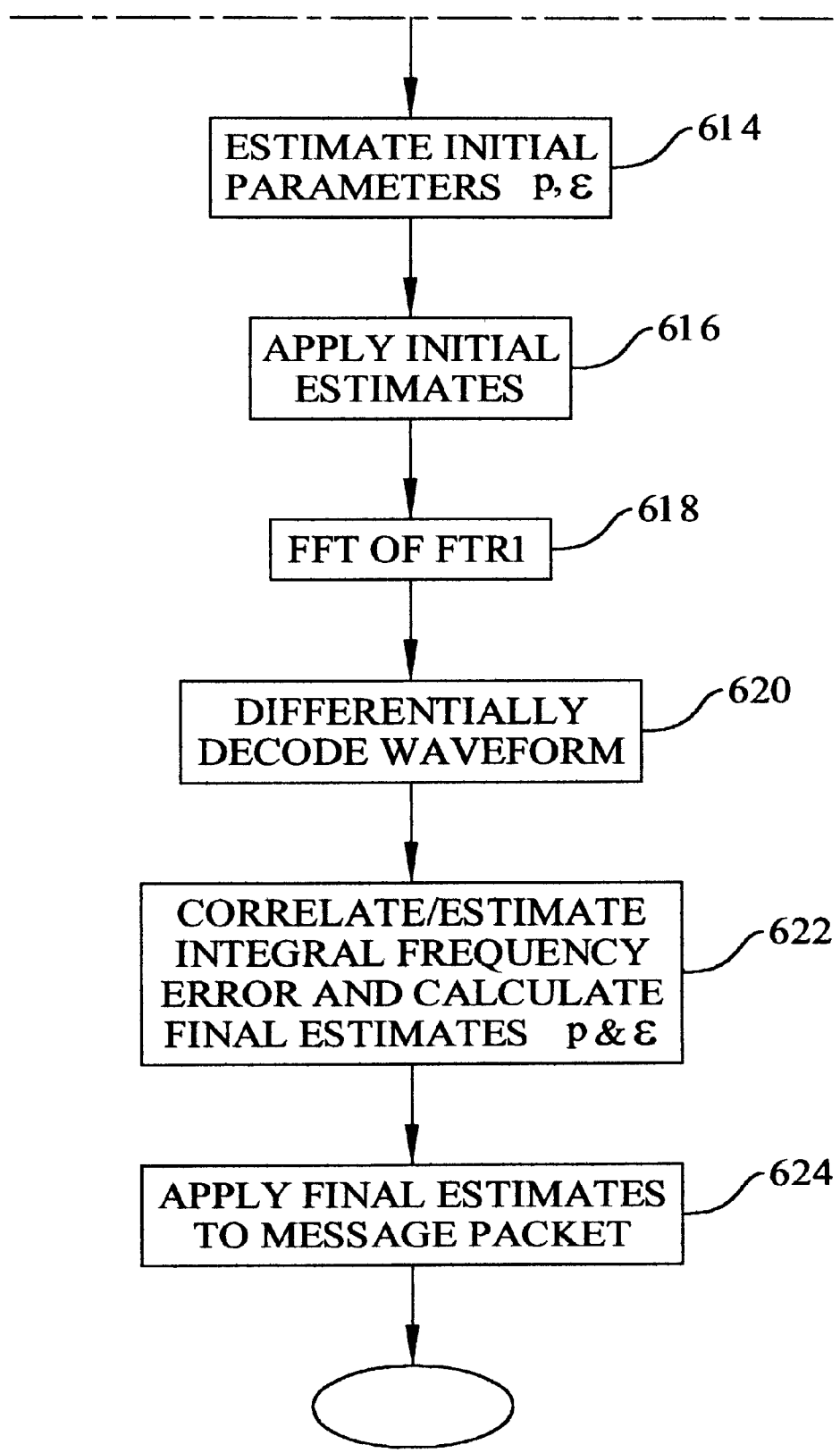
FIG. 6 is a flow chart of the steps performed by the frequency/timing recovery circuit of the present invention.
Figure 7:
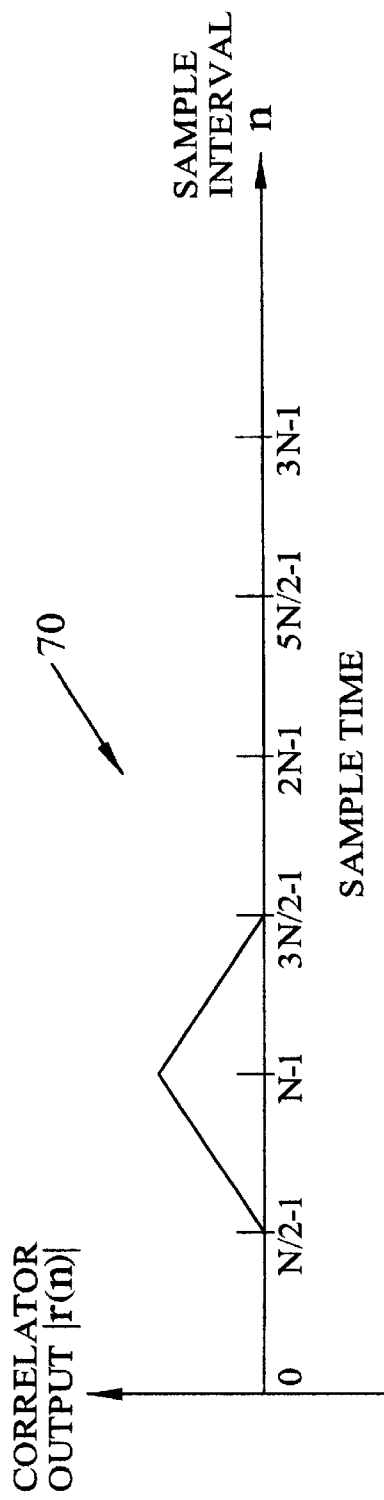
FIG. 7 is a plot of the cross-correlation magnitude of a frequency/timing recovery symbol vs. sample time interval.

FIG. 6 is a flow chart 60 of the steps performed by frequency/timing recovery circuit 506 during the first processing iteration. At step 602, in-phase and quadrature-phase samples 50S are input to frequency/timing recovery circuit 506. At step 604, in-phase and quadrature-phase samples 505 are delayed by half a symbol period, i.e., N/2 sample time intervals At step 606, the delayed symbols are correlated with input samples from step 602. The sample time and phase of the correlation peak is output at step 610. Applying equation (7), the magnitude of the cross-correlation obtained at sample interval N−1 reaches a peak given by:

$$r(N-1) = A^2 NK/4 \tag{8}$$

which is half the energy in FTR1 204. Before and after sample interval N−1, the expected value of the correlation magnitude has a triangular envelope with a base of N sample intervals given by:

$$E\{r(n)\} = A^2 K[n + 1 - N/2]/2, \ N/2 \leq n \leq N - 1 \tag{9}$$

and $$E\{r(n)\} = A^2 K[3N/2 - 1 - n]/2, \ N - 1 \leq n \leq 3N/2 - 2 \tag{10}$$

as illustrated in the plot of FIG. 7.

If the received RF/IF signal was subjected to an unknown frequency off set $\delta f$, the frequency shifted signal using equation (1) may be expressed as:

$$y(u) = \sum_k x_k(u) \exp[j(2\pi \delta f u)], \ 0 \leq u \leq \Delta T \tag{11}$$

or in discrete form from equation (5) as:

$$y(n) = \sum_k x_k(n) \exp[j(2\pi(p + \epsilon)2n/N)], \ 0 \leq n \leq N - 1 \tag{12}$$

where $$\delta f = (p + \epsilon) 2\Delta f. \tag{13}$$

The integer p gives the frequency offset to the nearest sub-carrier frequency in FTR1 204, and $\epsilon$ is the fractional frequency offset given by:

$$-\tfrac{1}{2} \leq \epsilon \leq \tfrac{1}{2} \tag{14}$$

After N−1 samples of the RF/IF signal have been cross-correlated at step 612, the magnitude of the correlation output is given by:

$$r(N-1) = A^2 NK/4 \; \exp[j 2\Pi \epsilon]. \tag{15}$$

Figure 8:
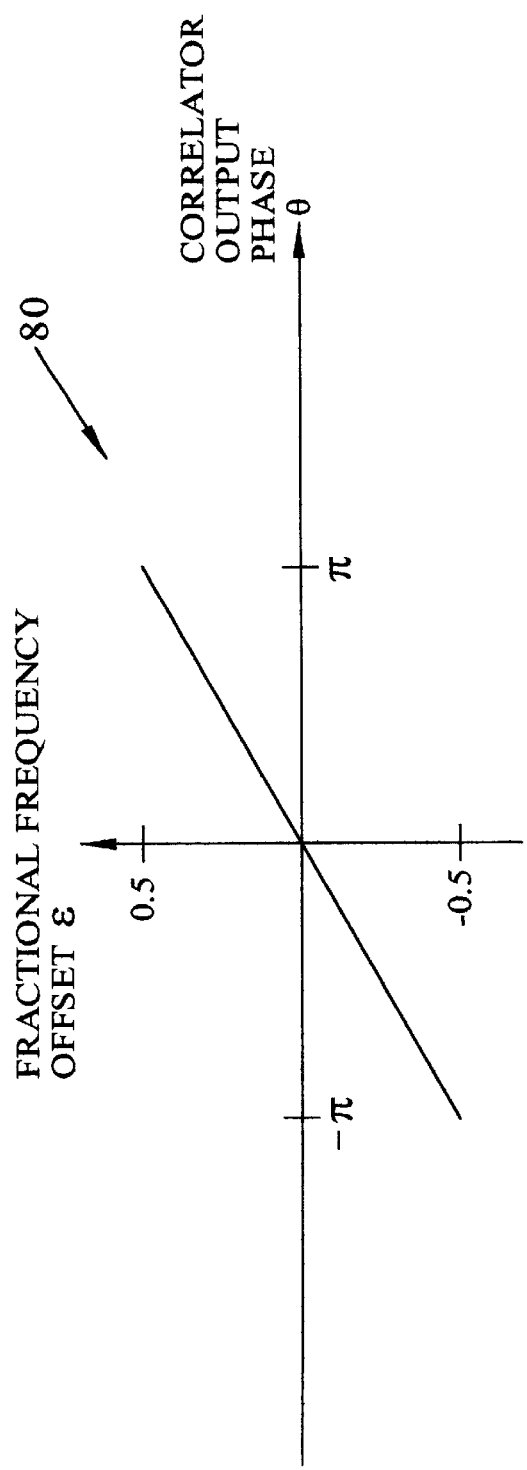
FIG. 8 is a plot of the fractional frequency offset vs. cross-correlator output phase.

The magnitude of the correlator output, as in equation (8), is the peak magnitude of the correlation and provides a coarse measurement of the sample timing. The phase of the correlation output according to its principal value between −Π and +Π yields the fractional frequency offset e between −½ and +½ at step 614, which is illustrated in the plot of FIG. 8.

In wireless multi-path channels, wireline channels, and possibly cable channels, a phase distortion may occur in an OFDM message packet in addition to a frequency offset. OFDM message payload symbols are provided with a guard interval that is a cyclic extension of the data portion of the corresponding payload symbol. The guard interval length is selected to be greater than or equal to the length of the impulse response of the channel to avoid inter-symbol interference. FTR1 symbols are provided with a guard interval also, however the FTR1 guard interval preferably contains information uncorrelated with the data in the remainder of the FTR1 symbol. This is done to avoid elongating the peak of the correlation output magnitude that would degrade the precision of the symbol timing estimate. For channels with an impulse response having a length of $N_h$ sample intervals, the peak of the expected value of the correlation output given by equation (15) may occur as late as sample $N+N_h-1$. $N_h$ is much less than N in OFDM transmissions, and in practice it has been demonstrated that the actual peak is much closer to N−1 than to $N+N_h-1$.

At this step of the timing/frequency recovery function, the integer frequency offset p has not yet been resolved. Also, due to the noise and the wide base of the triangular envelope of the correlation output magnitude and the much smaller length of the channel impulse response, the sample timing offset is subject to an error of several samples. As mentioned above, this error biases the symbol timing estimate to a value that is slightly greater than N−1. To obtain a more precise timing estimate, N samples of FTR1 204 are extracted from the in-phase and quadrature-phase basebanded data using the coarse timing estimate. These N samples are corrected by the estimated value of the fractional frequency offset at step 616 using the following formula:

$$y_I(n) = y(n)\exp[-j 2\Pi \epsilon (2n)/N], \; I-N \le n \le I-1 \tag{16}$$

where I is the sample index of the first symbol following FTR1 204 determined by the coarse timing estimate. From equation (12) it follows that:

$$y_I(n) = \sum_k x_k(n) \exp[j 2\pi p (2n)/N], \; I-N \le n \le I-1 \tag{17}$$

so that the corrected signal 507 now has the sub-carriers given by:

$$y_k(n) = A \exp[j 2\Pi(k+p)(2n)/N + \Phi_k], \; -K/4 \le k \le K/4-1 \tag{18}$$

Extracting every other Fourier coefficient using FFT 508 on the interval $I-N \le n \le I-1$ at step 618 yields for the non-zero values:

$$Y_k = A \exp(j \Phi_{k-p}) \exp(j(2\Pi 2k(I-N)/N), \; -K/4 \le k \le K/4-1 \tag{19}$$

Differentially demodulating extracted coefficients 509 results in decoded coefficients 511 at step 620 using the formula:

$$D_k = Y_k (Y_{k-1})^* = A^2 \exp[j \theta_{k-p}] \exp(j(2\Pi 2(I-N)/N),$$
$$-K/4 + 1 \le k \le K/4 - 1 \tag{20}$$

These coefficients are then correlated at step 622 against FTR1 204 information $\{\theta_k\}$ using the formula:

$$R_I = \sum_k D_{k+I} \exp(-j \theta_k), \; -K/4+1 \le k \le K/4-1 \tag{21}$$

which has a peak at I=p given by:

$$R_p = (K/2 - 1) A^2 \exp(j 2\Pi(I-N)/N) \tag{22}$$

The value of I for which the correlation output magnitude in equation (21) peaks is therefore equal to p, the integer frequency offset. The phase of equation (21) at its peak value gives the sample timing error I−N. Unlike the first cross-correlation of FTR1 204, there is a single sharp peak in the magnitude of equation (21) because the correlation is against a stored reference instead of a delayed version of the same signal. For other values of 1, the correlation output magnitude is given by:

$$E\{R_p R_p^*\} < A^4 (K/2 - 1) \tag{23}$$

so that the signal to sidelobe noise power ratio of the correlation function for determining p is given by:

$$SNR_p = K/2 - 1 \tag{24}$$

Figure 9:
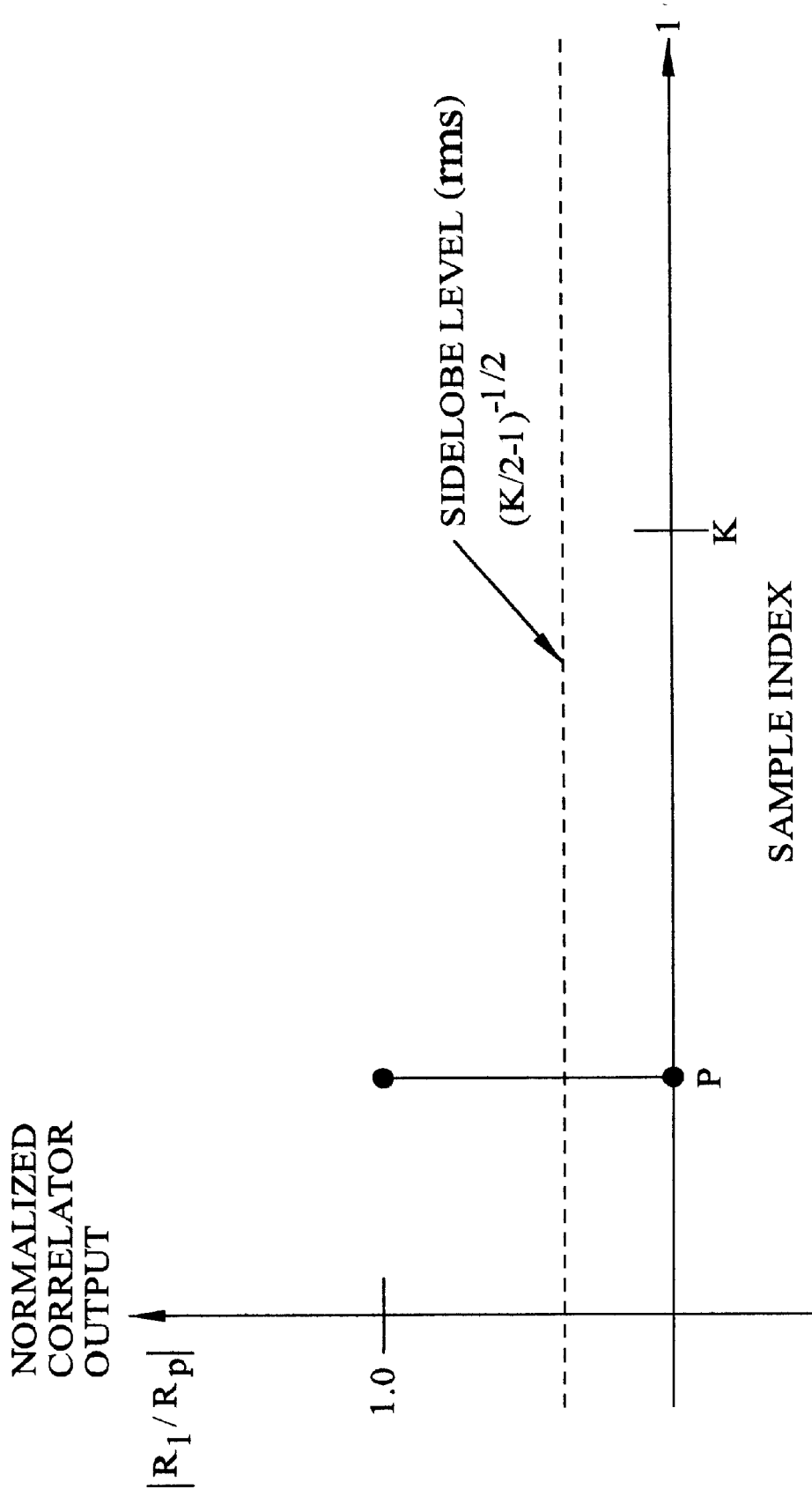
FIG. 9 is a plot of the normalized correlation output magnitude vs. sub-carrier frequency sample index.

FIG. 9 is a plot of the magnitude of the correlation function $R_1$ normalized by the peak correlation output vs. sample index 1. Because differentially demodulated frequency domain coefficients are used in both the signal and the reference data, the frequency/timing recovery process is insensitive to any multi-path that might be present in FTR1 204. Detection of the correlation output peak gives p, the integer value of the frequency offset now used in conjunction with e, the fractional value of the frequency offset, to correct all of the OFDM message payload symbols in the message packet. The fine estimate of the symbol timing error determined from the phase in equation (21) is used to correct the symbol timing at step 624 to give the final estimate of the first sample time used to synchronize the OFDM symbols to the FFT.

In alternate embodiment, a second frequency/timing recovery symbol FTR2 is sent in the preamble immediately following FTR1. All K sub-carriers are transmitted with predetermined random differentially encoded PSK information in FTR2. The correlation formula given by equation (21) is applied to all K−1 differentially decoded values from FTR2 so that the correlation output magnitude is given by:

$$R_I = \sum_k D_{k+I} \exp(-j \theta_k), \; -K/2+1 \le k \le K/2-1 \tag{25}$$

and again at I=p there is a peak given by:

$$R_p = (K-1) A^2 \exp(j 2\Pi(I-N)/N) \tag{26}$$

The correlation output magnitude for other values of 1 is given by:

$$E\{R_p R_p^*\} < A^4 (K-1) \tag{27}$$

so that the signal to sidelobe noise power ratio of the correlation function for determining p is given by:

$$SNR_p = K-1 \quad (28)$$

In operation, frequency/timing recovery circuit 506 derives sync information from a frequency/timing recovery symbol sent as the first symbol of each message packet. The sync information is obtained by an iterative complex-valued correlation in which the real parts are in-phase sample values and the imaginary parts are quadrature-phase sample values.

In the first iteration, the redundant portions of the frequency/timing recovery symbol are cross-correlated from basebanded signal 103 using a half-symbol delay and an integration time of a half-symbol. Because the first and second halves of the frequency/timing recovery symbol are identical, a correlation magnitude peak occurs when the last sample value of the frequency/timing recovery symbol is correlated. The sample time of the correlation magnitude peak provides a coarse estimate of symbol timing, and the phase value at the correlation magnitude peak measures the amount of frequency offset of the sub-carriers modulo frequency spacing, providing a fine estimate of frequency offset.

In the second iteration, the sample values of the same frequency/timing recovery symbol are selected using the timing information from the first iteration. These sample values are frequency-shifted by the fine frequency offset estimate obtained from the first iteration, with the result that the residual frequency offset will be an integer multiple of the sub-carrier frequency spacing. The demodulated frequency-shifted sample values from differential demodulator 110 are then cross-correlated with the predetermined values for the frequency/timing recovery symbol. A correlation peak occurs at a relative frequency shift index that corresponds to the number of integer sub-carrier frequency spacings left unresolved by the fine frequency offset estimate obtained from the first iteration, providing a precise total frequency offset. The phase of the correlation peak measures any residual offset in the symbol timing. The resultant frequency and timing information is applied to the entire message packet to effect demodulation and decoding of the OFDM signal.

Frequency/timing recovery circuit 104 outputs corrected symbol values 105 to FFT 106. FFT 106 outputs FFT coefficients 107 to packet disassembler 108. Packet disassembler outputs disassembled message packets 109 to differential demodulator 110. Differential demodulator 110 demodulates the encoded information and outputs demodulated symbols 111 to symbol decoder 113 and to frequency/timing recovery circuit 104. Symbol decoder 113 outputs decoded symbols 113 representative of the message packet information encoded in RF/IF signal 101.

Other modifications, variations, and applications of the present invention may be made in accordance with the above teachings other than as specifically described to practice the invention within the scope of the following claims.

We claim:

1. A signal synchronizer for an orthogonal frequency division multiplexed (OFDM) signal comprising:
   a first correlator for estimating a coarse estimate of symbol timing and a fine estimate of fractional sub-carrier spacing frequency offset from a received frequency/timing recovery symbol;
   a frequency shifter for applying the fine estimate of the fractional sub-carrier spacing frequency offset to shift the sub-carrier frequency of the received frequency/timing recovery symbol;
   a time shifter for applying the coarse symbol timing estimate to the received frequency/timing recovery symbol;
   an FFT for finding Fourier coefficients of the frequency shifted frequency/timing recovery symbol;
   a differential decoder for decoding the frequency/timing recovery symbol;
   a second correlator for correlating the decoded frequency/timing recovery symbol against the received frequency/timing recovery symbol for finding a total frequency offset and a fine estimate of symbol timing;
   a second frequency shifter [symbol decoder] for applying the total frequency offset and the fine estimate of symbol timing to decode message payload symbols in the OFDM message packet;
   and a second time shifter for applying the fine estimate of symbol timing to decode message payload symbols in the OFDM message packet.

2. The signal synchronizer for an orthogonal frequency division multiplexed signal of claim 1 wherein the frequency/timing recovery symbol comprises at least two identical fractional parts.

3. The signal synchronizer for an orthogonal frequency division multiplexed signal of claim 2 wherein the frequency/timing recovery symbol comprises a guard band of data uncorrelated with data in the symbol halves.

4. The signal synchronizer for an orthogonal frequency division multiplexed signal of claim 1 further comprising a basebander coupled to the first correlator for basebanding the OFDM signal.

5. The signal synchronizer for an orthogonal frequency division multiplexed signal of claim 4 further comprising an automatic gain control (AGC) coupled to the basebander.

6. The signal synchronizer for an orthogonal frequency division multiplexed signal of claim 5 wherein the frequency shift δf of the sub-carrier signal may be expressed as:

$$y(u) = \sum_k x_k(u) \exp[j(2\pi\delta f u)], \ 0 \le u \le \Delta T$$

or in discrete form as:

$$y(n) = \sum_k x_k(n) \exp[j(2\pi(p+\epsilon)2n/N)], \ 0 \le n \le N-1$$

where $$\delta f = (p+\epsilon)2\Delta f,$$

wherein the integer p represents the frequency offset to the nearest sub-carrier frequency and e represents fractional frequency offset.

7. The signal synchronizer for an orthogonal frequency division multiplexed signal of claim 6 wherein the fractional frequency offset is applied to correct the basebanded OFDM signal according to the following formula:

$$y_I(n) = y(n) \exp[-j2\pi\epsilon(2n)/N], \ I-N \le n \le I-1$$

where I is the sample index of a first symbol following the frequency/timing recovery symbol determined by the coarse timing estimate.

* * * * *